United States Patent [19]

Houd

[11] 4,078,882
[45] Mar. 14, 1978

[54] BURNING OF PULVEROUS OR GRANULAR RAW MATERIALS

[75] Inventor: Rolf Dietrich Houd, Copenhagen, Denmark

[73] Assignee: F. L. Smidth & Co., Cresskill, N.J.

[21] Appl. No.: 686,571

[22] Filed: May 14, 1976

[30] Foreign Application Priority Data

May 16, 1975 United Kingdom ............... 20905/75

[51] Int. Cl.² ............................................. F27B 15/00
[52] U.S. Cl. ....................................... 432/14; 432/78; 432/80; 432/106
[58] Field of Search ................... 432/13, 1415, 78, 80, 432/106

[56] References Cited

U.S. PATENT DOCUMENTS

| 2,965,366 | 12/1960 | O'Mara et al. | 432/13 |
| 3,206,526 | 9/1965 | Rygaard | 432/13 |

*Primary Examiner*—John J. Camby
*Attorney, Agent, or Firm*—Pennie & Edmonds

[57] ABSTRACT

A method is disclosed for burning pulverous or granular raw material such as cement raw meal in a rotary kiln plant by directing a first flow of raw material to a cyclone preheater, preheating the first flow of raw material in the cyclone preheater, and directing the preheated raw material from the cyclone preheater to a rotary kiln for burning the material in the kiln. The burnt kiln product is directed to a cooler which may be of several types and which communicates with the material outlet of the kiln while a second flow of fresh raw material is directed to the cooler to at least partially cool the burnt kiln product by transferring heat therefrom to the second flow of fresh raw material in the cooler. The method further involves combining the preheated, at least partially calcined second flow of material with the first flow of preheated, at least partially calcined material prior to directing the combined flows to the rotary kiln and thereafter directing the combined flows to the kiln for burning and for subsequent cooling in the cooler. The invention also pertains to a unique kiln plant for practicing the inventive method.

59 Claims, 11 Drawing Figures

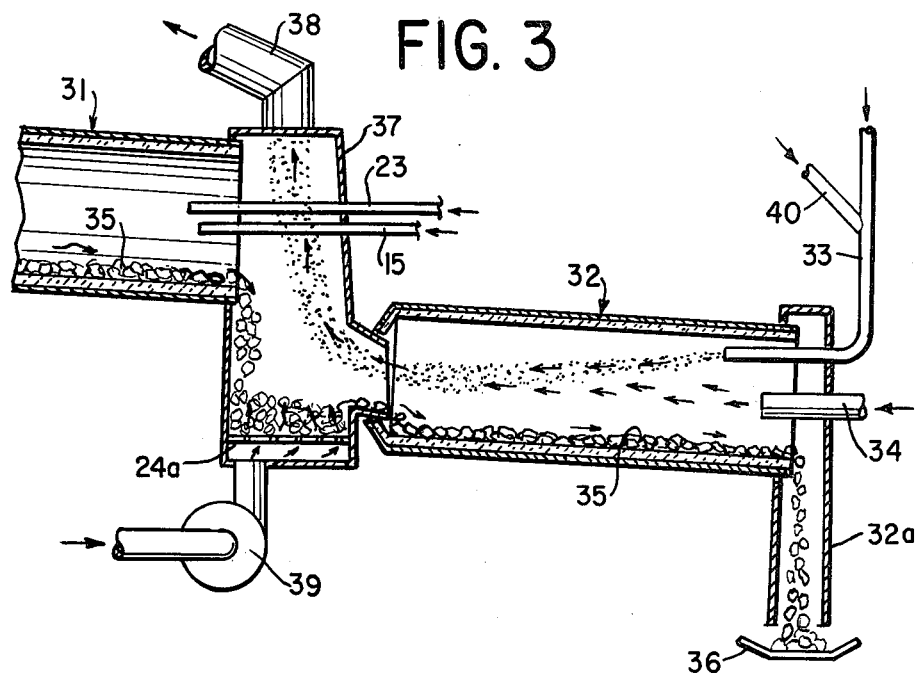
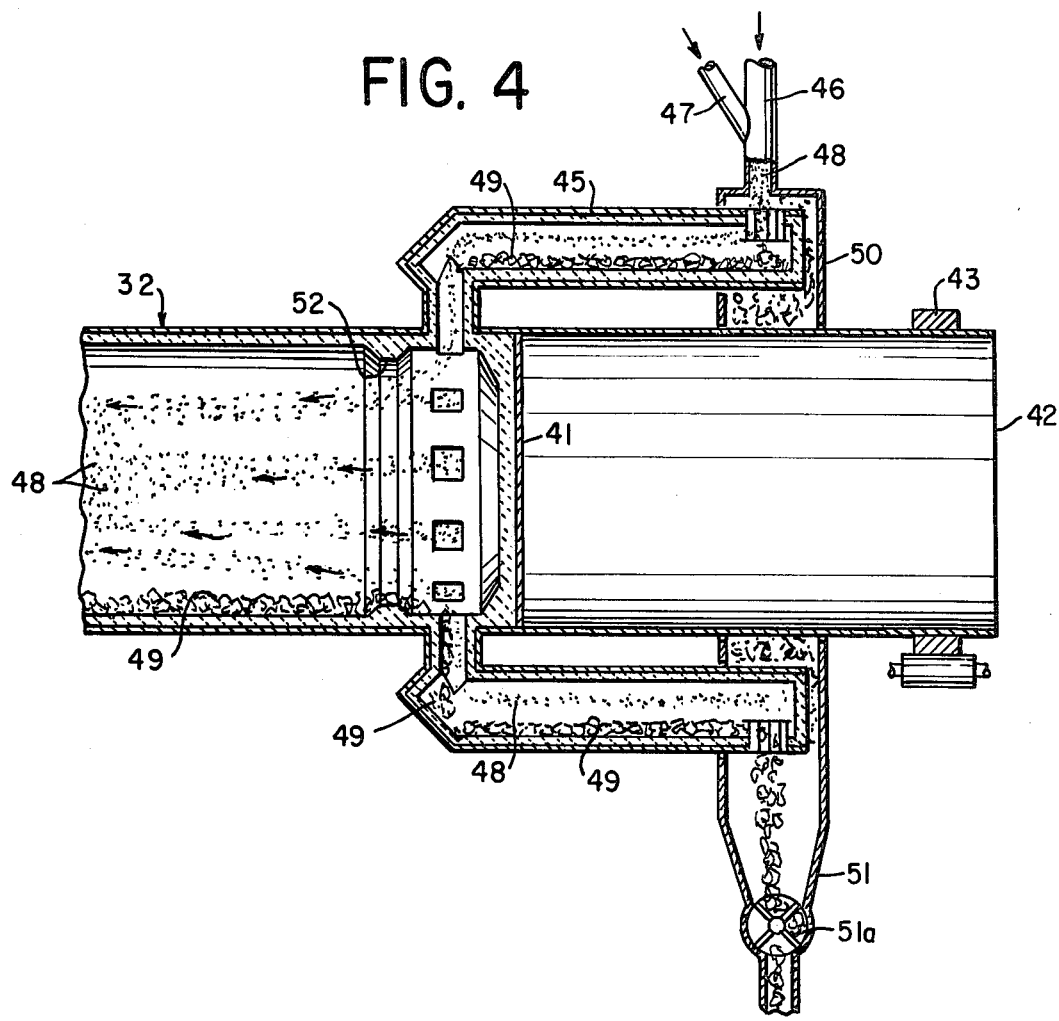

BURNING OF PULVEROUS OR GRANULAR RAW MATERIALS

BACKGROUND OF THE INVENTION

1. Field of the Invention

This invention relates to improvements in heat-treating pulverous or granular raw material such as cement raw meal, lime and aluminum oxide, in a kiln plant.

2. Description of the Prior Art

In modern kiln plants, the kiln is usually of a rotary type and the process taking place in the kiln is generally sought to be limited to sintering of the materials to be treated, prior to feeding them to a cooler for cooling before further treatment. It is thus a prerequisite among other things to achieve maximum preheat-treatment in the preheating and/or calcining stage, followed by maximum cooling in the cooling stage. However, to achieve these ends, it has been found that heat exchange units of rather larger dimensions are required.

For example, the use of the heat in the spent cooling air of the preheat-treatment stage involves transporting the hot spent cooling air from one end of the kiln to the other, with the consequent inevitable heat loss, and the need for a large and efficient cooler and a large preheater and associated exhaust fans. Furthermore, if the material is subjected to a precalcination — an endothermic process of expelling gases such as carbon dioxide — in a calciner coupled to the preheater, the substantial amount of smoke produced by the burning of fuel in the calciner requires the use of large precipitators and even larger exhaust fans.

Japanese Patent Publication No. 3916 of 1963 relates to a process and kiln apparatus for burning cement wherein the heat transfer to the material delivered to the kiln is sought to be maximized. According to this process, cement raw materials are introduced into a rotary kiln either at the forward or at an intermediate position of the kiln and allowed to be heated and fluidized while flowing with the kiln gases toward the rear of the kiln. Thereafter the material is permitted to precipitate onto the kiln floor for further heat treatment in the kiln while moving along the inclined kiln bottom toward its foward end. British Pat. No. 1,396,402 relates to a process and device for treating particulate material by means of gases in a reaction chamber having a separator connected downstream of the gas flow. The material is passed into the reaction chamber as a suspension in a gas so as to be passed twice through the reaction chamber prior to being removed therefrom as a stream of material separated from the gas.

While these attempts improve somewhat the efficiency of the individual heating chambers, they nevertheless are not as effective as is desirable in improving the efficiency of the entire kiln plant while improving substantially its capacity. I have invented a method of heating such raw materials and a plant for practicing the method, in which the kiln plant capacity is substantially improved while the dimensions of at least certain portions of the preheater, calciner, cooler, smoke gas fans and precipitators are substantially decreased without increasing the power consumption of the plant.

SUMMARY OF THE INVENTION

In accordance with the invention, a method is disclosed for burning pulverous or granular raw material such as cement raw meal in a kiln plant comprising directing a first flow of raw material to a preheating means and directing the preheated raw material from the preheating means to a kiln. The method further comprises burning the preheated raw material in the kiln and directing the burnt kiln product from the kiln to a cooling means communicating with the material outlet end portion of the kiln. The method further comprises directing a second flow of fresh raw material to the cooling means and at least partially cooling the sintered kiln product from the kiln in the cooling means by transferring heat from the product to the second flow of fresh raw material in the cooling means. The preheated, at least partially calcined second flow of raw material is thereafter combined with the first flow of at least partially preheated, at least partially calcined raw material prior to directing the combined flows of at least partially preheated raw material from the kiln for burning therein and for subsequent cooling in the cooling means.

In the preferred embodiments, the preheat-treatment for the first flow is accomplished by means of a multistage cyclone suspension preheater having a calciner coupled to the last stage. The preheat-treatment of the second flow of material is accomplished by means of a cooling device in the form of either a grate cooler or a rotary cooler with or without planetary cooler tubes coupled thereto.

The preheat-treatment to which the two flows of the raw material are subjected in the preheater and the cooler, respectively, may be only a preheating. The two flows may be united, subject to a calcination process and then burned in the kiln. Preferably, however, the preheat-treatment to which the second flow of material is subjected in the cooler includes both a preheating and at least a partial calcining.

The two flows of material may be united in a calciner which is coupled to the preheater. Heat for calcining is developed by burning fuel added locally to the calciner in the presence of oxygen contained in the spent air taken from the cooler. Alternatively, only the first flow of material may be at least partially calcined in the preheater-coupled calciner, the second flow of material then preferably being subjected to a similar degree of calcining in the cooler and being united with the first flow downstream of the preheater calciner.

Preferably, the second flow of material is conveyed to be united with the first flow, suspended in spent cooling air from the cooler. The second flow of the raw material may constitute 5–40% of the total amount of raw material fed to the kiln plant.

The second flow of raw material may be suspended in atmospheric air before being passed to the cooler. In the cooler, the atmospheric air in which the material has been suspended may be combined with atmospheric air supplied to the cooler for cooling the final product, at least part of the combined air flow then constituting both the heated spent cooling air, which is caused to pass through the preheater, and a carrier for carrying the preheat-treated second flow of the raw material from the cooler into unity with the preheat-treated first flow of the raw material.

Instead of being suspended in atmospheric air before being passed to the cooler, the second flow of raw material may be initially mixed with the kiln product and treated together with the product in the cooler and subsequently separated from the kiln product and suspended in the cooling air. If the material is fed to the hotter part of the cooler or into the precooling zone of the kiln proper near the kiln outlet, the raw material will be mixed with the kiln product in the hotter part of the cooler and simultaneously preheated and at least partly calcined, and may subsequently be separated from the kiln product and suspended in the cooling air prior to its further treatment in the plant.

If the raw material is fed to and mixed with the kiln product in the colder part of the cooler, it may thereby be preheated and subsequently separated from the kiln product and suspended in the cooling air and, while passing with the air through the hotter part of the cooler, at least partially calcined by means of the heat given off by the kiln product in that part of the cooler.

As such a large fraction of the spent cooling air from the cooler is passed to the preheater for use in the preheating, and in the calcination, if any, of the first flow of raw material, the remaining spent cooling air may be insufficient to nourish the combustion of the fuel fed to the kiln to produce the heat required for carrying through the sintering process in the kiln. An extra amount of atmospheric air must then be passed into the kiln. This extra amount of atmospheric air may in advance be preheated by indirect heat exchange with gases from the kiln in a heat exchanger of known kind.

The invention also relates to a kiln plant for burning pulverous or granular material which comprises cooling means coupled to the kiln for cooling the burned kiln product by means of atmospheric air, at least one raw material preheating means coupled to the kiln for preheat-treating at least a first continuous supply of raw material directed thereto, means for directing at least a second continuous supply of raw material into and through the cooling means, means for directing spent cooling air with the second supply of raw material suspended therein to flow to the preheating means in a manner to enable at least a substantial portion of the second supply of material to be united with the first supply of material.

The preheater may be combined with a calciner to which is supplied a continuous flow of preheat-treated material. The second flow of preheat-treated material from the cooler may be conveyed by a pipe leading from the cooler to the lower part of the preheater, the first and the second flows of material thus being united before being jointly passed into the kiln, in which at least the greater part of the burning (sintering) takes place. Alternately, a pipe may lead from the cooler to a calciner coupled to the lower end of the preheater, thus enabling the first and the second flows of raw material to be jointly calcined partly or completely before being passed to the kiln.

The cooler may be equipped with means for suspending the second supply of raw material in atmospheric air and for passing it into the cooler while in suspension. Alternatively, the plant may comprise means for mixing the second flow of raw material with the kiln product and means for separating the material from the kiln product, after treatment in the cooler of the material together with the product, and suspending the material in the cooling air.

The means for mixing may consist, for example, of an appropriate construction of the mouth of a pipe feeding raw material to the cooler and ensuring a distribution of the raw material into and over the total width of: (1) the kiln product charge in the cooler, (2) the movable shoes of a grate cooler, (3) a rotating cooler or cooler tube which produces turbulence of the kiln product charge together with the added raw material in the cooler or cooler tube, (4) a conveyor feeding the raw material into the kiln product at the bottom of a stationary casing between the kiln outlet end and the cooler inlet ends, or (5) a combination of two or more of these alternatives.

The cooler may be a grate cooler or it may be an underlying, rotating cooler. The latter may be supplemented by a planetary cooler, the cooler tubes of which are provided around and rotate with the outlet end of the underlying, rotating cooler. The cooler may further be equipped with means for passing the second supply of raw material together with atmospheric air into each individual planetary cooler tube so as to proceed through the tube mainly suspended in the air, and into the underlying cooler, still mainly suspended in the air.

It is thus an essential feature of the invention that raw material is fed not only to the preheater as already known, but also that a second separate supply of raw material is passed to the cooler. The heat from the kiln product is then used in the cooler as soon as it is available, and the following advantages are achieved:

The cooler dimensions may be reduced because the preheating and preferably partial calcination of raw meal in the cooler consumes some of the heat which previously had to be removed by means of a larger cooling surface.

The spent cooling air may be transported to the preheater at a lower temperature, resulting in less heat loss.

The preheater can be diminished because it is to preheat only part of the amount of raw material supplied to the plant and only requires an amount of gas sufficient for that purpose.

The calciner, if any, can be diminished with a consequent decrease in fuel consumption for the calcination when part of the materials are partly calcined in the cooler before they are fed to the preheater-coupled calciner or the kiln.

Finally, smoke gas fans and precipitators can be diminished as a consequence of the aforesaid decreased requirement of smoke gas for carrying through the process.

Calculations have shown that balancing the separate amounts of material supplied to the preheater and cooler, respectively, and balancing the smoke gas produced during the calcination in relation to the heat consumption of the preheater during the preheating process may ensure an economy of 10–12% in the fuel consumption of the plant compared with a plant of similar type in which the total amount of raw material has to pass through the preheater.

BRIEF DESCRIPTION OF THE DRAWINGS

Preferred embodiments of the invention are described herein below with reference to the drawings wherein:

FIG. 3 illustrates an underlying, rotating cooler for partial calcination of the raw materials;

FIG. 4 illustrates an underlying, rotating cooler supplemented with a planetary cooler for partial calcination of the raw materials;

DETAILED DESCRIPTION OF THE PREFERRED EMBODIMENTS

Figure 1:
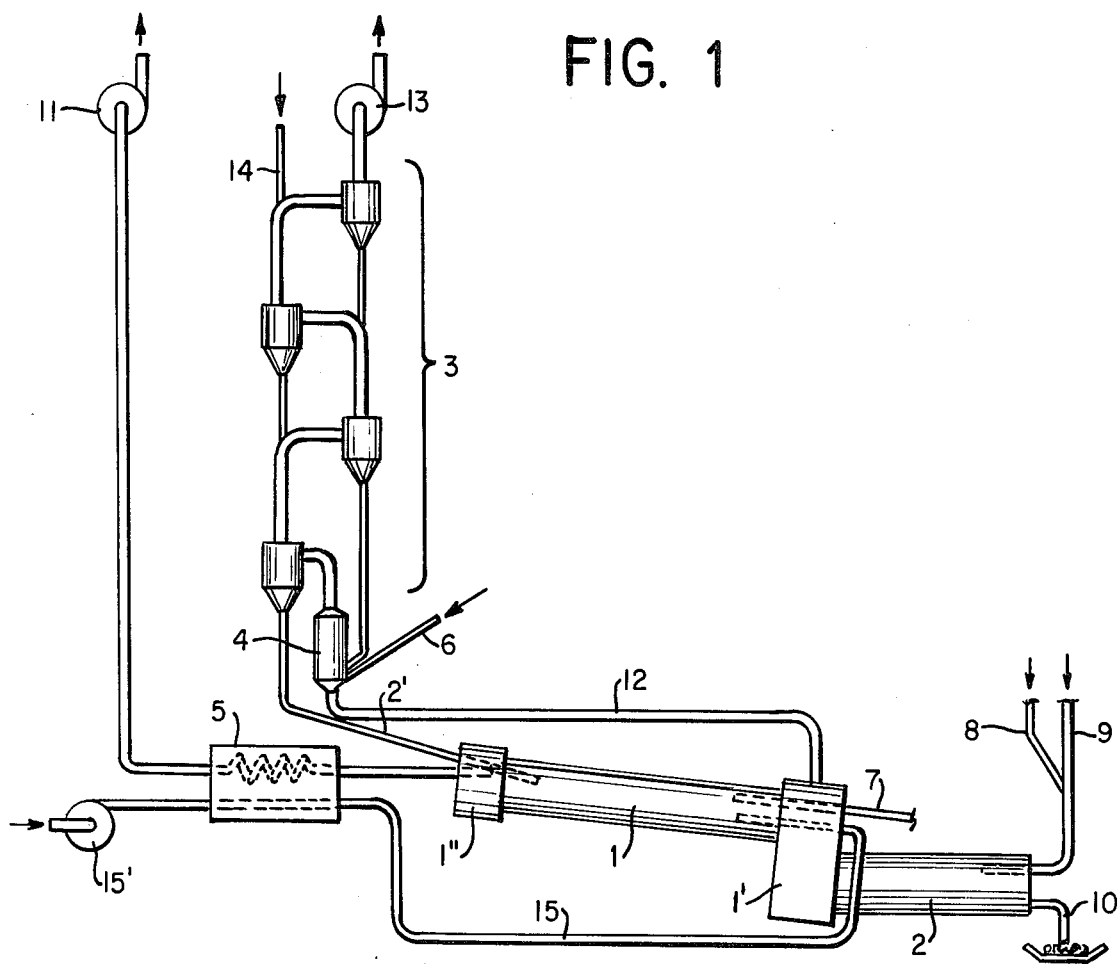
FIG. 1 illustrates a rotary kiln plant utilizing the method of the present invention.

Referring to FIG. 1, a rotary kiln plant according to the invention is illustrated for utilizing the method of the present invention. The plant includes a rotary kiln 1, a cooler 2, a preheater 3, a calciner 4 and a heat exchanger 5. Both kiln ends are surrounded by stationary casings 1' and 1", respectively as shown. Fuel is fed to the calciner 4 at a burner 6 and to the kiln 1 at a burner 7. The casing 1' connects the kiln 1 with the cooler 2 whereas the casing 1" connects the kiln 1 with the heat exchanger 5. Pulverous or granular raw material is fed partly to the preheater 3 through pipe 14 (first supply) and partly to the cooler 2 through pipe 8 (second supply).

A first supply of raw material is preheated and partially calcined in the preheater 3 by smoke gases in a manner known in the art. These smoke gases, produced in the calciner 4, are drawn through the preheater by a fan 13. The preheated materials pass through the calciner 4, into a lowermost preheater stage and via a down pipe 2' to the kiln 1.

A second supply of raw material is blown from pipe 8 together with atmospheric air from pipe 9 into the outlet end of the cooler 2. The flow of air suspends the raw material above the kiln product in the cooler 2. The materials pass through the cooler 2, countercurrently to the kiln product, and are simultaneously partially calcined by the heat from the kiln product. The treated materials pass from the cooler 2 through the casing 1' and a pipe 12 directly into the calciner 4 together with a substantial fraction of the preheated cooling air to be utilized in the calciner. The remaining spent cooling air from the cooler is insufficient to nourish the combustion of the fuel fed to the kiln to produce the heat required for carrying through the sintering process. Consequently, additional atmospheric air must be passed into the kiln 1. For this purpose, secondary air is forced through pipe 15 by fan 15' after being preheated by an indirect heat exchange in heat exchanger 5 with exit gases from the kiln. In the calciner 4, the materials deriving from both the first and the second supplies of raw material are jointly finished calcined, or at least substantially finished calcined, and the total amount of the material is then passed on to the kiln 1.

By thus dividing the process of calcination between calciner 4 and cooler 2, it is thus possible to improve simultaneously the utilization of the heat produced in the cooler and the desired reduction in the dimensions of the cooler 2, the calciner 4 and preheater 3. As this method implies that the smoke gas produced in the calciner 4 can satisfy the requirements for preheating the materials in the preheater 3, all smoke gases produced in the kiln may be passed through the casing 1" directly to the heat exchanger 5 so as to be used in known manner for preheating the secondary air. The secondary air is fed to the kiln through the pipe 15 and the smoke gas is subsequently removed from the heat exchanger 5 by fan 11. Further power economy of the total plant thus is achieved.

Figure 2:
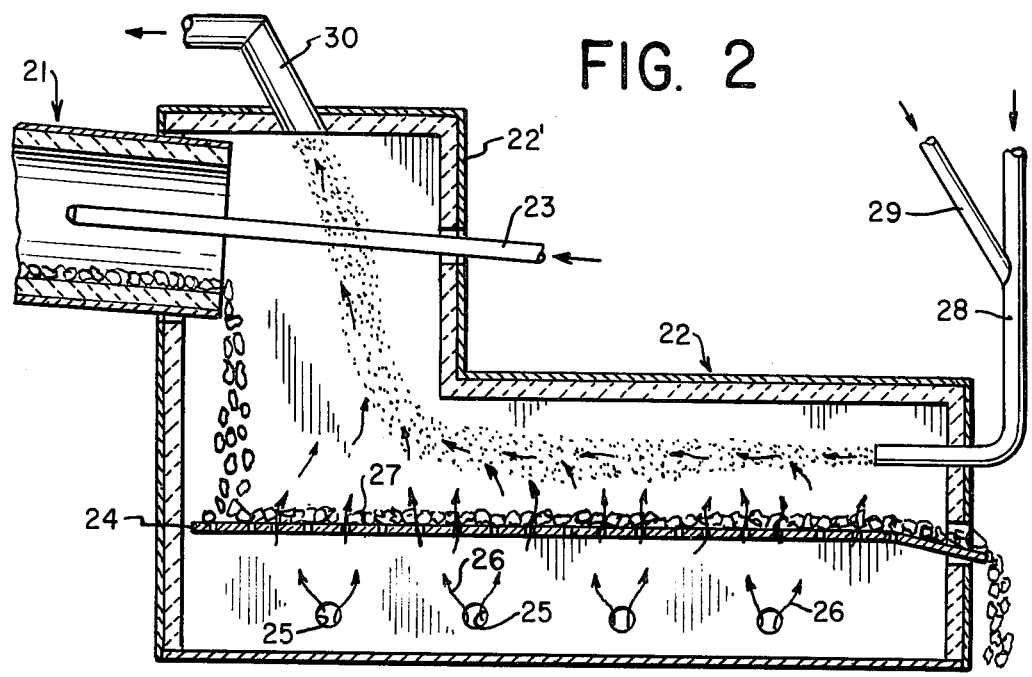
FIG. 2 illustrates a grate cooler for partial calcination of pulverous or granular raw materials.

Referring to FIG. 2, a grate cooler for partial calcination of pulverous or granular raw materials is illustrated. The cooler 22 is connected to a rotary kiln 21 by a stationary casing 22'. The kiln is provided with a burner 23, and the cooler is provided with an injection means 25 from which cooling air 26 passes through the grate 24 of the cooler. A supply of raw material mixed with air is blown through a pipe 28 into the outlet end of the cooler. The mixing of the raw material with air takes place in the pipe 28, the raw materials being fed to the pipe 28 through another pipe 29. In the cooler, the material is caught by the flows of cooling air 26, which after passing the kiln product 27 distributed on the grate of the cooler, have a temperature of approximately 850° C., the raw material being kept in suspension above the kiln product. As a result, a partial calcination of the raw material takes place, the materials being subsequently passed directly to the calciner through a pipe 30 together with the air preheated in the cooler. For the sake of clarity, the secondary air pipe 15 shown in FIG. 1 has been omitted from FIG. 2.

Referring to FIG. 3, an underlying, rotating cooler 32 is adapted for partial calcination of pulverous or granular raw material is illustrated. The cooler is connected via a stationary casing 37 to a rotary kiln 31 with a burner 23 and a pipe 15 for feeding extra secondary air into the kiln. A secondary supply of raw material is introduced from a pipe 40 into a flow of air passing through a pipe 33 and is blown through the pipe 33 into the outlet end of the cooler. The cooling air, which is fed to the cooler through a pipe 34, carries with it the raw material suspended in the flow of air above the kiln product 35. The kiln product 35 located at the bottom of the cooler 32 is agitated during rotation of the cooler. While passing through the cooler, the cooling air is heated by the kiln product to approximately 850° C., and a partial calcination of the raw material suspended in the cooling air takes place. The materials and preheated cooling air are subsequently passed from the cooler 32 through a pipe 38 directly to the calciner. Smoke gas passes from the kiln to a heat exchanger as described in detail in connection with FIG. 1. A suitable device 36 is provided for conveying clinker after the cooler, and a quenching device 39 is positioned at the stationary casing 37 for preliminary clinker cooling.

Referring to FIG. 4, an underlying, rotating cooler supplemented with a planetary cooler for partial calcination of the raw materials is illustrated. The planetary cooler includes cooler tubes 45 which are arranged at identical intervals around the outlet end of the underlying cooler, the cooler tubes being fixed to rotate with the underlying cooler 32. An outer steel mantle forms a cylindrical elongation 42 at the lower end portion of the underlying cooler 32 with end bottom 41 to support the cooler 32 in a known manner in a bearing 43.

A stationary outlet casing 50 collects the kiln product 49 passing through the cooler 32. The outlet casing 50 is provided at its lower end with an outlet 51 and with a rotary valve gate 51a. At its upper end, the outlet casing 50 is provided with a pipe 46 for feeding air to the cooler tubes 45. The second supply of raw material is fed from a pipe 47 into a flow of air 48 passing through a pipe 46. The raw material is suspended in the flow of air and passes via the casing 50 through the cooler tubes 45 above the kiln product 49. In known manner, cooling suction air for the planetary cooler tubes 45 will pass constantly from the outlet casing 50 through leaks and hatches in the latter to the tubes carrying with it all the raw material from pipe 47 suspended in air in pipe 46 before entering the outlet casing 50. In the cooler tubes 45, the air is heated to approximately 850° C. by the kiln product, resulting in a partial calcination of the raw materials.

The mixed flow 48 of air and raw material passes through the tubes 45 countercurrently to the kiln product to the underlying cooler 32 in which partial calcination and preheating continues. The material and the preheated cooling air from the inlet end of the underlying cooler 32 are subsequently passed (through the latter directly to the underlying cooler 32 and) to the calciner as described in referring to FIGS. 1 and 3. Dam ring 52 ensures a correct outflow of the kiln product from the underlying cooler 32 to the cooler tubes 45.

Figure 5:
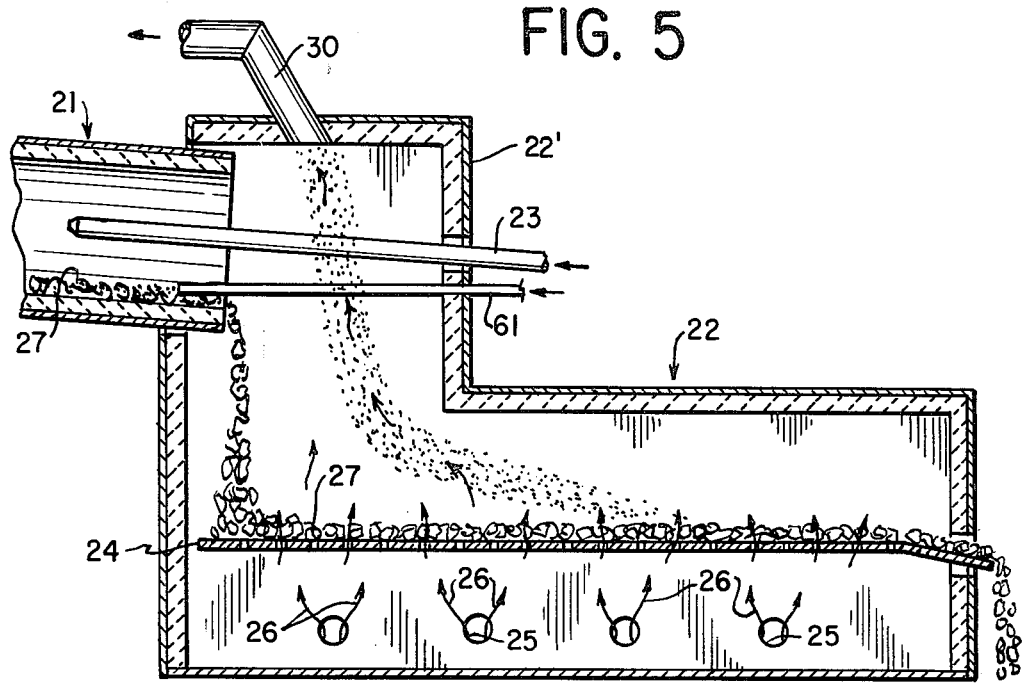
FIG. 5 illustrates a grate cooler coupled after a kiln, whereby the raw material is fed to the precooling zone at the kiln output for mixing with the kiln product.

Referring to FIG. 5, a grate cooler 22 is coupled with a kiln 21 at its material outlet end as shown. Raw material is fed to the precooling zone at the kiln output through pipe 61 for mixing with the kiln product as shown. The arrangement of FIG. 5 is similar to the arrangement of FIG. 2 except for the pipe 61. The second flow of raw material is fed into the kiln product through pipe 61 at the precooling zone. The kiln product and raw feed mix and pass into the hotter part of the cooler. Thus, the raw material is preheated and partly calcined by the heat from the kiln product. While passing through the cooler, the raw material is separated from the kiln product, suspended in the cooling air 26, and passes with the spent cooling air through a pipe 30 to the calciner.

Figure 6:
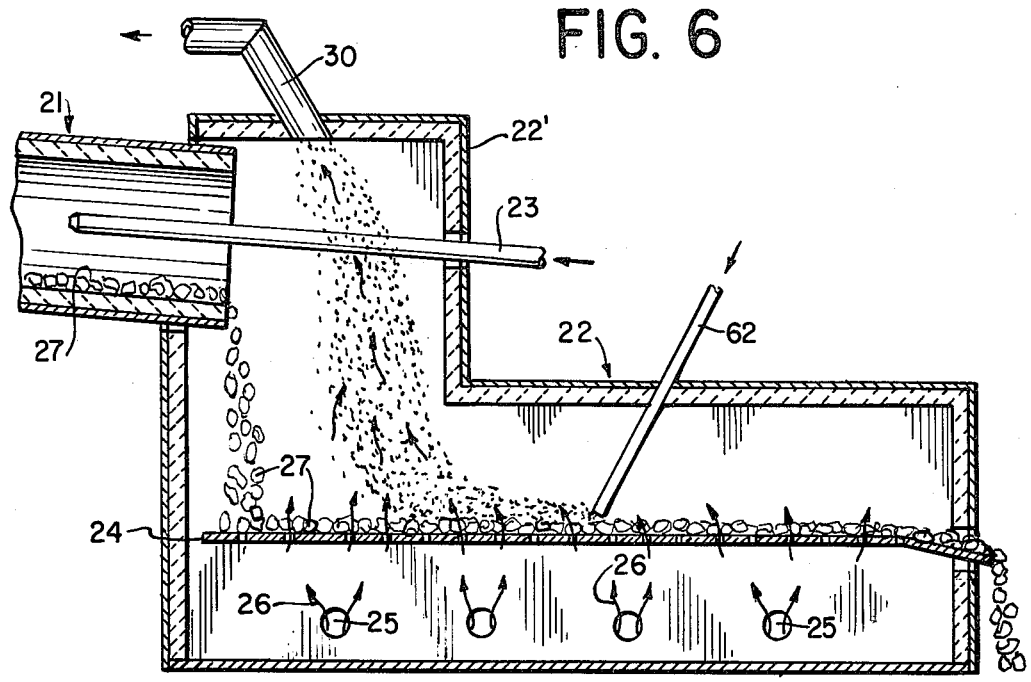
FIG. 6 illustrates a grate cooler coupled after a kiln, whereby the raw material is fed to a location adjacent the output end of the cooler for mixing with the kiln product.

Referring to FIG. 6, a grate cooler 22 is coupled with a kiln 21 at its material outlet end as shown. Raw material is fed through pipe 62 near the output end (colder part) of the cooler for mixing with the kiln product as illustrated. The arrangement of FIG. 6 is similar to the arrangement of FIG. 3 except for pipe 62. The raw material is fed through pipe 62 positioned at the colder part of the cooler and into the kiln product. The raw material is mixed with the kiln product, preheated, separated from the kiln product, and suspended in the spent cooler air 26. During their passage through the hotter part of the cooler, the raw materials are partially calcined.

Figure 7:
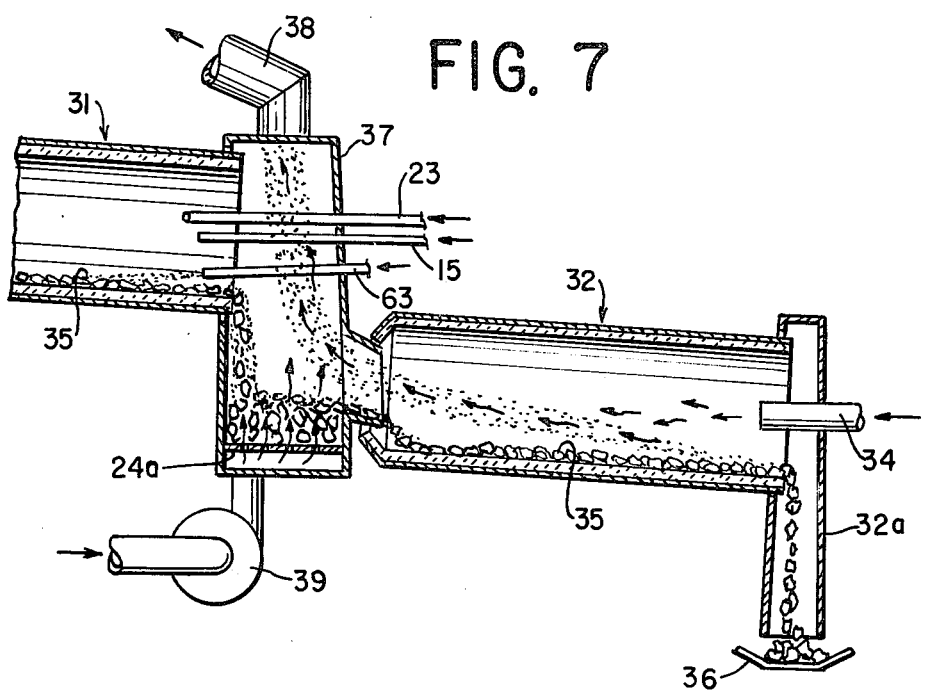
FIG. 7 illustrates an underlying, rotating cooler whereby the raw material is fed to the precooling zone at the kiln output for mixing with the kiln product.
Figure 8:
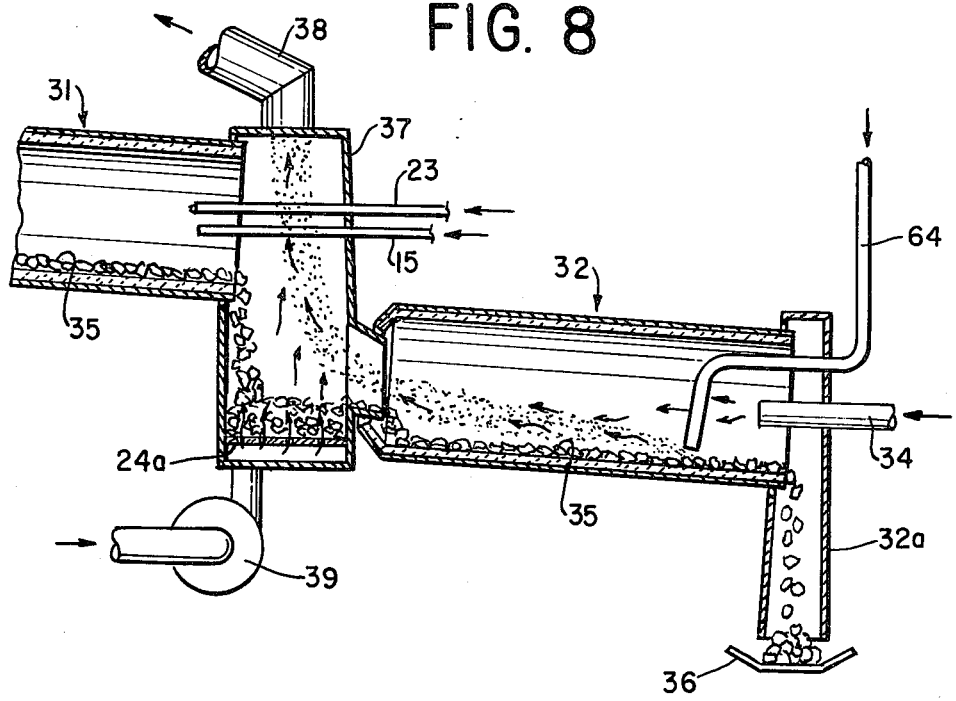
FIG. 8 illustrates an underlying, rotating cooler, whereby the raw material is fed near the output end of the cooler for mixing with the kiln product.

The FIGS. 7 and 8 examples are similar to that of FIG. 3, apart from pipes 63 and 64. The two constructions shown in FIGS. 7 and 8 do not differ from those shown in FIGS. 5 and 6 except for the cooler being an underlying, rotating cooler and not a grate cooler and the cooling air being fed to the plant through pipe 34 and fan 39. Compared with pipes 33 and 40 of FIG. 3 no mixing of raw material with air takes place in pipe 64 shown in FIG. 8.

Figure 9:
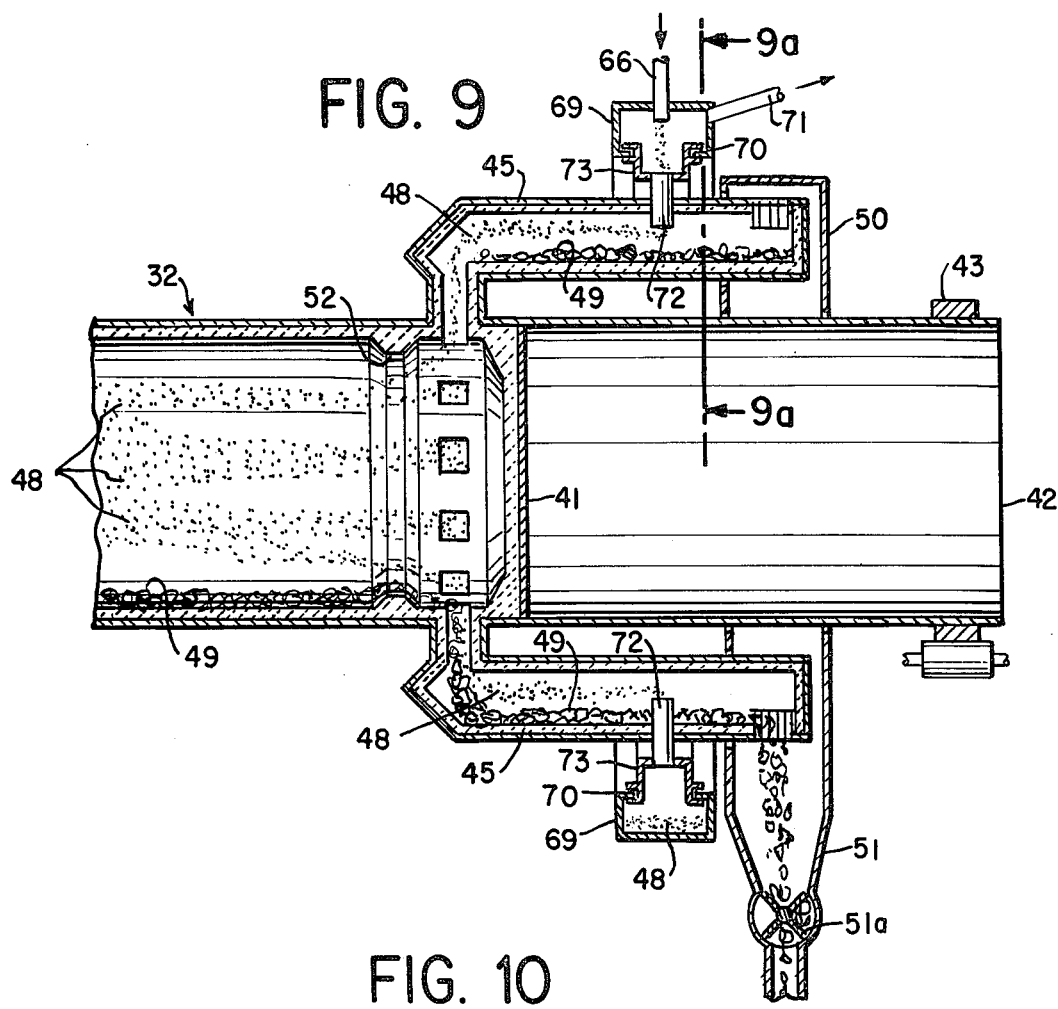
FIG. 9 illustrates an underlying, rotating cooler supplemented by a planetary cooler, whereby the raw material is fed to the planetary cooler tubes and mixed with the kiln product.

Referring to FIG. 9, there is illustrated an underlying, rotating cooler supplemented by a planetary cooler, with the raw material fed to the planetary cooler tubes 45 and mixed with the kiln product as illustrated. FIG. 9 corresponds to FIG. 4, except for a pipe 66. Raw material is fed into the kiln product charge 49 in the cooler tubes through pipe 66. The raw materials from pipe 66 pass into a ring-formed trough construction 69, 73 surrounding the cooler tubes 45. The trough construction consists of a stationary outer U-formed ring 69 in which the pipe 66 is mounted, and an inner trough-formed ring 73 in fixed connection with the cooler tubes 45 and rotating with same. The inner ring 73 is sliding in the outer ring 69 via a labyrinth seal 70. Each cooler tube 45 is in connection with the trough-formed inner ring via pipes 72 passing raw material from the trough into each tube 45. To remove dust too light to pass together with the raw material into the pipes 72 from the inner hollow space between the two rings a dedusting pipe 71 may be connected to the outer ring 69 to suck out and recirculate the dust to a separator (not shown) and back to pipe 66 in known manner.

Figure 9A:
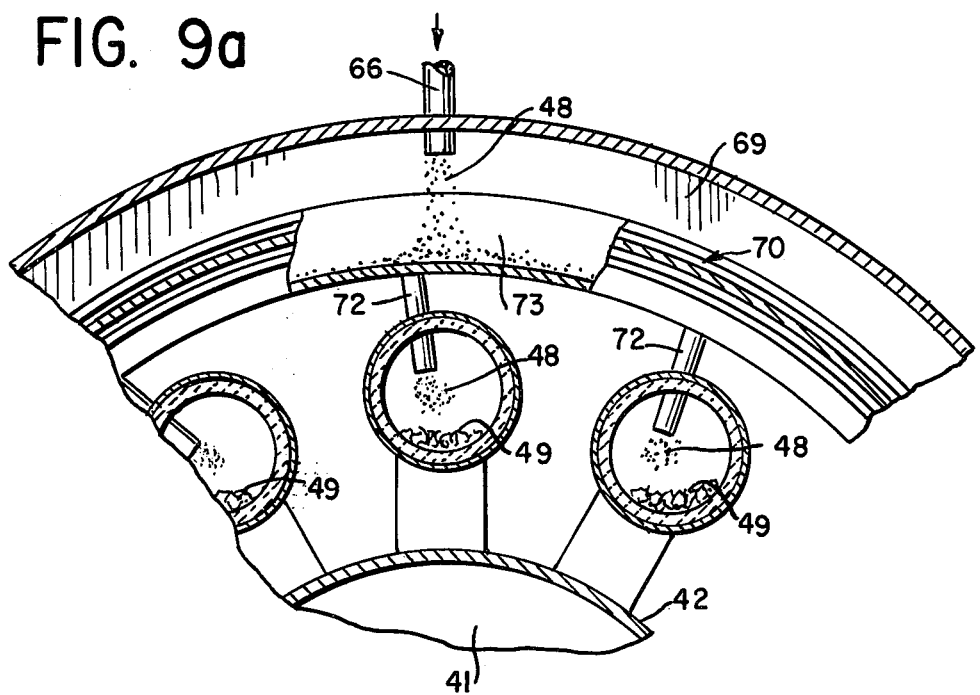
FIG. 9a is a view taken along lines 9a — 9a of FIG. 9.

FIG. 9a shows a sectional view of part of the trough construction and some of the cooler tubes with the same references as used above.

Figure 10:
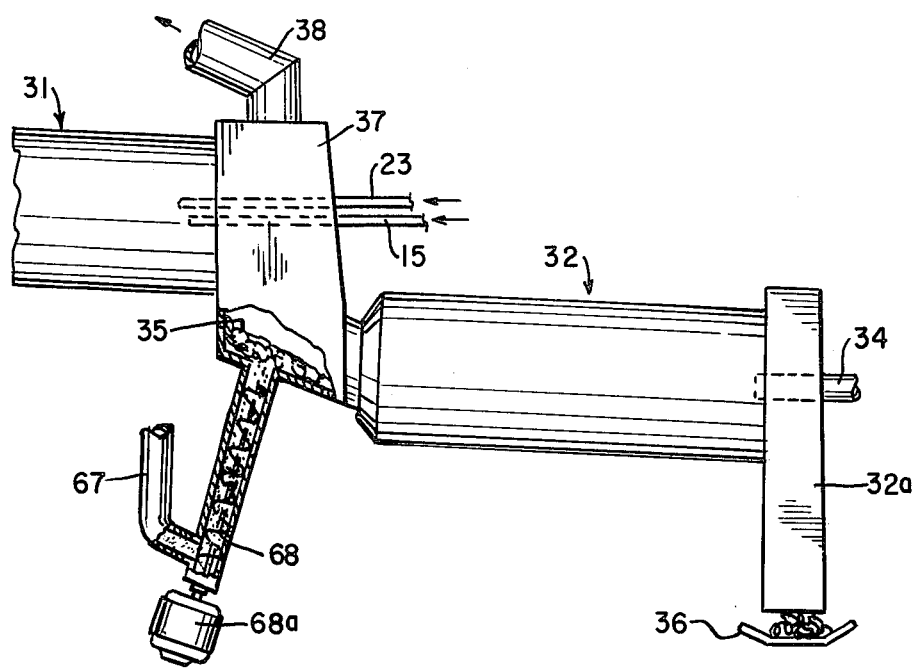
FIG. 10 illustrates an arrangement for feeding raw material to the cooling zone adjacent the kiln product outlet for mixing with the kiln product.

Referring to FIG. 10, an alternate arrangement is illustrated for feeding raw material to the cooling zone. The arrangement includes a rotary kiln 31, a stationary casing 37 and an underlying, rotating cooler 32 corresponding to the plant shown in FIG. 3. The raw material is fed through a pipe 67 to a conveyor, such as a worm conveyor 68, and transported to the bottom of the stationary casing 37 connecting the kiln 31 and the rotary cooler 32. When it enters the bottom of the casing 37, the raw material is mixed with the kiln product and passes down through the casing to the cooler. The raw materials are preheated, partially calcined by the heat from the kiln product, separated from the kiln product and suspended in the cooling air as described with reference to FIGS. 3 and 7. I claim:

1. A method of burning pulverous or granular raw material in a kiln plant comprising:
    (a) directing a first flow of raw material to a preheating means;
    (b) preheating the first flow of raw material in said preheating means;
    (c) directing said preheated material from said preheating means to a kiln;
    (d) burning said preheated material in said kiln;
    (e) directing the burnt kiln product from said kiln to a cooling means communicating with the outlet portion of the kiln, said cooling means having cooling air passing therethrough;
    (f) discharging a second flow of fresh raw material directly into said cooling means proper so as to contact at least one of heated cooling air and burnt kiln product therein;
    (g) at least partially cooling said burnt kiln product from said kiln in said cooling means by transferring heat therefrom to at least one of said cooling air and said second flow of fresh raw material in said cooling means while simultaneously preheating and at least partially calcining said second flow of fresh raw material by the transferred heat in said cooling means;
    (h) combining the preheated, at least partially calcined second flow of material with the first flow of at least partially preheated, at least partially calcined material prior to directing said combined flows of material to the kiln; and
    (i) directing said combined flows of at least partially preheated material to said kiln for burning therein and for subsequent cooling in said cooling means.

2. A method of burning pulverous or granular raw material in a kiln plant having means for preheating the raw material, a kiln for burning the preheated raw material, and means for cooling the kiln product by cooling air comprising:
(a) directing a first flow of fresh raw material to said preheating means;
(b) preheating the first flow of raw material in said preheating means;
(c) discharging a second flow of fresh raw material into said cooling means proper so as to contact at least one of heated cooling air and burnt kiln product therein thereby preheating said raw material by heat transferred from the burned kiln product in said cooling process of the cooling means;
(d) combining at least a portion of said first and second preheated raw material flows;
(e) directing the combined preheated raw material flows to said kiln;
(f) burning said raw material in said kiln;
(g) directing the kiln product directly to said cooling means;
(h) cooling the kiln product in said cooling means by transferring at least a portion of the heat from the kiln product to at least one of said cooling air and said second flow of raw material in said cooling means while simultaneously preheating said second flow of fresh raw material by the transferred heat in said cooling means; and
(i) removing the kiln product from said cooling means.

3. A method of burning pulverous or granular raw material in a kiln plant having a kiln for burning the material therein, preheating means communicating with the material inlet end of the kiln for preheating fresh raw material prior to being subjected to a final burning process in the kiln, cooling means communicating with the material outlet end portion of the kiln for cooling the hot kiln product by means of atmospheric air directed to said cooling means comprising:
(a) directing a flow of fresh raw material to the kiln plant;
(b) dividing the flow of raw material into at least two streams;
(c) directing a first stream of said fresh raw material to said preheating means for preheating and at least partially calcining therein prior to being subjected to a final burning process in the kiln;
(d) discharging said second stream of fresh raw material directly into said cooling means proper so as to contact at least one of heated cooling air and burnt kiln product therein, thereby subjecting said second flow of fresh raw material to a preheating and at least partial calcination therein by means of heat transferred from the burnt kiln product prior to subjecting said second stream of material to a final burning process in the kiln;
(e) combining said second stream of preheated, at least partially calcined raw material from said cooling means with said first stream of preheated, at least partially calcined raw material from said preheating means prior to directing the raw material to a final burning process in said kiln;
(f) directing said combined flow of preheated, at least partially calcined raw material to said kiln;
(g) burning said material in said kiln;
(h) directing the burnt kiln product to said cooling means for cooling;
(i) directing said kiln product from said kiln to said cooling means so as to be subjected to a cooling process therein; and
(j) directing the at least partially cooled burnt kiln product away from said cooling means.

4. The method according to claim 3 further comprising uniting the two preheat-treated flows of material when both material flows have attained substantially the same degree of heat treatment.

5. The method according to claim 3 further comprising directing lime-containing raw material to said kiln plant.

6. The method according to claim 4 further comprising directing lime-containing raw material to said kiln plant.

7. The method according to claim 5 further comprising directing said second flow of material to said cooling means and subjecting said second flow of material to a preheating and at least partial calcining therein.

8. The method according to claim 3 further comprising:
(a) uniting said two flows of material in a calciner coupled to the preheating means; and
(b) producing heat in said calciner for at least partially calcining said material by burning fuel added locally in the presence of oxygen contained in the spent cooling air from the cooling means.

9. The method according to claim 4 further comprising:
(a) uniting said two flows of material in a calciner coupled to the preheating means; and
(b) producing heat in said calciner for at least partially calcining said material by burning fuel added locally in the presence of oxygen contained in the spent cooling air from the cooling means.

10. The method according to claim 7 further comprising:
(a) uniting said two flows of material in a calciner coupled to the preheating means; and
(b) producing heat in said calciner for at least partially calcining said material by burning fuel added locally in the presence of oxygen contained in the spent cooling air from the cooling means.

11. The method according to claim 3 further comprising conveying said second flow of material to be united with said first flow of material when said second flow of material is suspended in spent cooling air from said cooling means.

12. The method according to claim 5 further comprising conveying said second flow of material to be united with said first flow of material when said second flow of material is suspended in spent cooling air from said cooling means.

13. The method according to claim 7 further comprising conveying said second flow of material to be united with said first flow of material when said first flow of material is suspended in spent cooling air from said cooling means.

14. The method according to claim 3 further comprising:
(a) initially mixing with the kiln product, said second flow of material;
(b) treating said second flow of material together with the product in said cooling means; and
(c) separating from the kiln product the treated material by suspending the material in cooling air.

15. The method according to claim 5 further comprising:

(a) initially mixing with the kiln product, said second flow of material;
(b) treating said second flow of material together with the product in said cooling means; and
(c) separating from the kiln product the treated material by suspending the material in cooling air.

16. The method according to claim 7 further comprising:
(a) initially mixing with the kiln product, said second flow of material;
(b) treating said second flow of material together with the product in said cooling means; and
(c) separating from the kiln product the treated material by suspending the material in cooling air.

17. The method according to claim 14 further comprising:
(a) feeding the second flow of material to at least one of the hotter parts of said cooling means and the precooling zone of said kiln;
(b) mixing said material with the kiln product in the hotter part of the cooling means in a manner to preheat and at least partially calcine said material; and
(c) subsequently suspending said material in cooling air thereby separating the material from the kiln product.

18. The method according to claim 14 further comprising:
(a) mixing the second flow of material fed to said cooling means with the kiln product in the cooler part of the cooling means;
(b) separating said material from the kiln product by suspending it in cooling air; and
(c) at least partially calcining said material by means of heat given off by the kiln product in the hotter part of the cooler while said material passes through the hotter portion of the cooling means.

19. The method according to claim 3 further comprising suspending said second flow of material in atmospheric air prior to passing said material to said cooling means.

20. The method according to claim 5 further comprising suspending said second flow of material in atmospheric air prior to passing said material to said cooling means.

21. The method according to claim 7 further comprising suspending said second flow of material in atmospheric air prior to passing said material to said cooling means.

22. The method according to claim 8 further comprising suspending said second flow of material in atmospheric air prior to passing said material to said cooling means.

23. The method according to claim 19 further comprising directing a substantial portion of material of said second material flow through said cooling means while suspended in a combined atmospheric air flow, at least one component of said air flow being the air flow utilized to carry the second flow of material to said cooling means and the other component being the air flow utilized inside said cooling means for cooling the final kiln product, at least a portion of said combined atmospheric air flow simultaneously constituting the heated spent cooling air which is thereafter directed through said preheating means, and the carrying means serving to carry the preheat-treated second flow of material to the preheat-treated first flow of material.

24. The method according to claim 23 further comprising directing a second material flow constituting between 5 and 40% of the total amount of material fed to the kiln plant.

25. A method of burning pulverous or granular raw material in a kiln plant having a preheating unit for preheating the raw material, a rotary kiln for burning the preheated material, and means for cooling the kiln product by cooling air directed through the cooling means, comprising:
(a) directing a first flow of fresh raw material to said preheating unit, said preheating unit being in the form of a multistage cyclone preheating unit;
(b) successively directing the preheated raw material to each stage of said preheating unit;
(c) preheating the first flow of fresh raw material in said preheating unit;
(d) discharging a second flow of fresh raw material into said cooling means proper to contact heated cooling air therein and thereby preheat said second flow of fresh raw material by heat transferred from the spent cooling air thereto;
(e) combining at least a portion of said first and second preheated raw material flows;
(f) directing the combined preheated raw material flows to said rotary kiln;
(g) burning said raw material in said rotary kiln;
(h) directing the burned kiln product directly to said cooling means;
(i) cooling the kiln product in said cooling means by transferring heat from the kiln product to said cooling air in said cooling means while simultaneously preheating said second flow of fresh raw material by transferring heat from said spent cooling air to said second flow of raw material within said cooling means; and
(j) removing the kiln product from said cooling means.

26. A method of burning pulverous or granular raw material in a kiln plant having a multistage preheating unit for preheating at least a portion of the raw material, a rotary kiln for burning the preheated material, and means for cooling the kiln product by cooling air directed through the cooling means, comprising:
(a) directing a first flow of fresh raw material to said preheating unit;
(b) successively directing the preheated raw material to each stage of said preheating unit;
(c) preheating the first flow of raw material in said preheating unit;
(d) discharging a second flow of fresh raw material into said cooling means proper so as to contact the burned kiln product therein and thereby preheat said raw material by heat transferred from the burnt kiln product in said cooling process of the cooling means;
(e) combining at least a portion of said first and second preheated raw material flows;
(f) directing the combined preheated raw material flows to said rotary kiln;
(g) burning said raw material in said rotary kiln.
(h) directing the burned kiln product directly to said cooling means;
(i) cooling the kiln product in said cooling means by transferring at least a portion of the heat from the kiln product to said second flow of raw material in said cooling means while simultaneously preheating said second flow of fresh raw material by the transferred heat in said cooling means; and (j) removing the kiln product from said cooling means.

27. A kiln plant which comprises a kiln for heat-treating preheated raw material, cooling means coupled to said kiln for cooling the kiln product by means of atmospheric air, at least one raw material preheating means coupled to said kiln for preheat-treating at least a first continuous supply of fresh raw material thereto, means for directing at least a second continuous supply of fresh raw material directly into and through said cooling means so as to contact at least one of heated cooling air and burned kiln product therein to at least preheat the material, means for directing spent cooling air with said second supply of raw material suspended therein to flow to said preheating means in a manner to enable at least a substantial portion of said second supply of material to be united with said first supply of material.

28. The kiln plant according to claim 27 wherein at least a substantial portion of the burning of said preheated raw material takes place in said kiln proper.

29. The plant according to claim 28 wherein said means for directing the spent cooling air to flow to said preheating means comprises a pipe connected to the lower portion of said preheating means in a manner to enable said first and second flow of material to be united prior to directing the combined flows of material into said kiln.

30. The kiln plant according to claim 27 further comprising calcining means coupled to the lower end portion of said preheating means.

31. The kiln plant according to claim 30 wherein said means for directing the spent cooling air to flow to said preheating means comprises a pipe connected to said calcining means and capable of directing said first and second flows of material jointly to be calcined at least partially in said calcining means prior to being directed to said kiln.

32. The kiln plant according to claim 27 wherein said cooling means further comprises means for suspending the fresh second flow of raw material in atmospheric air and for directing said material into said cooling means while in suspension therein.

33. The kiln plant according to claim 29 wherein said cooling means further comprises means for suspending the fresh second flow of raw material in atmospheric air and for directing said material into said cooling means while in suspension therein.

34. The kiln plant according to claim 31 wherein said cooling means further comprises means for suspending the fresh second flow of raw material in atmospheric air and for directing said material into said cooling means while in suspension therein.

35. The kiln plant according to claim 27 further comprising means for mixing the second flow of material with the kiln product, and means for separating the material from the kiln product by suspending the material in the cooling air of the cooling means after treatment of the combined kiln product and material in said cooling means.

36. The kiln plant according to claim 29 further comprising means for mixing the second flow of material with the kiln product, and means for separating the material from the kiln product by suspending the material in the cooling air of the cooling means after treatment of the combined kiln product and material in said cooling means.

37. The kiln plant according to claim 31 further comprising means for mixing the second flow of material with the kiln product, and means for separating the material from the kiln product by suspending the material in the cooling air of the cooling means after treatment of the combined kiln product and material in said cooling means.

38. The kiln plant according to claim 27 wherein said cooling means is a grate cooler.

39. The kiln plant according to claim 29 wherein said cooling means is a grate cooler.

40. The kiln plant according to claim 31 wherein said cooling means is a grate cooler.

41. The kiln plant according to claim 35 wherein said cooling means is a grate cooler.

42. The kiln plant according to claim 27 wherein said cooling means is an underlying, rotating cooler.

43. The kiln plant according to claim 29 wherein said cooling means is an underlying, rotating cooler.

44. The kiln plant according to claim 31 wherein said cooling means is an underlying, rotating cooler.

45. The kiln plant according to claim 35 wherein said cooling means is an underlying, rotating cooler.

46. The kiln plant according to claim 42 wherein the underlying, rotating cooler further comprises planetary cooling means having cooler tubes positioned about, and adapted to rotate with, the outlet end portion of the underlying cooler, said cooler further comprising means for directing the second flow of material together with atmospheric air into each individual planetary cooler tube in a manner to proceed through the tube while substantially suspended in said atmospheric air and into said underlying cooler while substantially suspended in said atmospheric air.

47. The kiln plant according to claim 43 wherein the underlying, rotating cooler further comprises planetary cooling means having cooler tubes positioned about, and adapted to rotate with, the outlet end portion of the underlying cooler, said cooler further comprising means for directing the second flow of material together with atmospheric air into each individual planetary cooler tube in a manner to proceed through the tube while substantially suspended in said atmospheric air and into said underlying cooler while substantially suspended in said atmospheric air.

48. The kiln plant according to claim 44 wherein the underlying, rotating cooler further comprises planetary cooling means having cooler tubes positioned about, and adapted to rotate with, the outlet end portion of the underlying cooler, said cooler further comprising means for directing the second flow of material together with atmospheric air into each individual planetary cooler tube in a manner to proceed through the tube while substantially suspended in said atmospheric air and into said underlying cooler while substantially suspended in said atmospheric air.

49. The kiln plant according to claim 45 wherein the underlying, rotating cooler further comprises planetary cooling means having cooler tubes positioned about, and adapted to rotate with, the outlet end portion of the underlying cooler, said cooler further comprising means for directing the second flow of material together with atmospheric air into each individual planetary cooler tube in a manner to proceed through the tube while substantially suspended in said atmospheric air and into said underlying cooler while substantially suspended in said atmospheric air.

50. The kiln plant according to claim 42 wherein said underlying rotating cooler further comprises planetary cooling means having a plurality of cooler tubes positioned about, and adapted to rotate with, at least the outlet end portion of the underlying cooler, said cooler further comprising means for mixing the second flow of material with the kiln product in the individual cooler tubes, and means for separating material from the kiln product for suspension in the cooling air prior to being introduced to the underlying rotating cooler.

51. A rotary kiln plant for burning pulverous or granular raw material which comprises a rotary kiln for sintering preheated raw material such as cement raw meal, cooling means connected to the material outlet end portion of the rotary kiln for cooling the sintered kiln product by means of atmospheric air, multistage cyclone preheating means coupled to the material inlet end portion of the rotary kiln for preheating and at least partially calcining at least a first continuous supply of raw material directed thereto, means for directing at least a second continuous supply of raw material into and through said cooling means while suspended in atmospheric air so as to be preheated by heat from the hot kiln product while simultaneously providing cooling means for the hot kiln product, means for directing the spent cooling air with said second supply of raw material suspended therein to flow to said preheating means in a manner to enable at least a substantial portion of said second supply of material to be combined with said first supply of material prior to being directed to the rotary kiln for burning therein, and means for directing the combined first and second flows of preheated material to said rotary kiln for sintering therein.

52. The rotary kiln plant according to claim 51 wherein the penultimate state of said cyclone preheater unit comprises a calcination chamber for at least partially calcining the first and second flows of preheated material prior to directing said combined flows of material to said rotary kiln for sintering.

53. The rotary kiln plant according to claim 52 further comprising means for directing a supply of preheated atmospheric air to the product outlet end portion of said rotary kiln in a manner to support combustion in the kiln.

54. The rotary kiln plant according to claim 53 wherein said supply of preheated atmospheric air is preheated by a heat exchanger having means for directing hot kiln gases therethrough for preheating the atmospheric air.

55. The rotary kiln plant according to claim 54 further comprising means for directing raw material to the material outlet end portion of said cooling means while suspended in atmospheric air in a direction countercurrent to the flow of the hot kiln product.

56. The rotary kiln plant according to claim 55 wherein said cooling means is a grate cooler.

57. The rotary kiln plant according to claim 55 wherein said cooling means is an underlying rotary cooler.

58. The rotary kiln plant according to claim 55 wherein said cooling means is an underlying cooler of the planetary type having a plurality of planetary cooler tubes connected to the material outlet end portion to rotate therewith for cooling the hot kiln product therein, with means being provided to collect and combine the hot kiln product from said planetary cooler tubes and to direct it away from the plant.

59. The kiln plant according to claim 27 wherein said means to direct fresh raw material directly into and through said cooling means is so arranged as to cause said raw material to contact at least one of heated cooling air and burned kiln product therein to preheat and at least partially calcine the material in said cooling means.

* * * * *

UNITED STATES PATENT AND TRADEMARK OFFICE
CERTIFICATE OF CORRECTION

PATENT NO. : 4,078,882

DATED : March 14, 1978

INVENTOR(S) : Rolf Dietrich Houd

It is certified that error appears in the above-identified patent and that said Letters Patent are hereby corrected as shown below:

Column 7, line 21 and line 22, "(through the latter directly to the underlying cooler 32 and) should read -- through the latter --

Signed and Sealed this

Fifteenth Day of August 1978

[SEAL]

Attest:

RUTH C. MASON
Attesting Officer

DONALD W. BANNER
Commissioner of Patents and Trademarks